(12) United States Patent
Stauffer et al.

(10) Patent No.: US 11,632,673 B2
(45) Date of Patent: Apr. 18, 2023

(54) PORTABLE ELECTRONIC AUTHENTICATION DEVICE

(71) Applicant: The Swatch Group Research and Development Ltd, Marin (CH)

(72) Inventors: Jérôme Stauffer, Neuchâtel (CH); Thierry Scordilis, Cormondrèche (CH); Luca De Rosa, Colombier (CH)

(73) Assignee: The Swatch Group Research and Develonment Ltd, Marin (CH)

( * ) Notice: Subject to any disclaimer, the term of this patent is extended or adjusted under 35 U.S.C. 154(b) by 313 days.

(21) Appl. No.: 16/924,813

(22) Filed: Jul. 9, 2020

(65) Prior Publication Data

US 2021/0076210 A1 Mar. 11, 2021

(30) Foreign Application Priority Data

Sep. 9, 2019 (EP) ..................................... 19196180

(51) Int. Cl.
*H04L 29/06* (2006.01)
*H04W 12/06* (2021.01)
*H04W 4/80* (2018.01)
*B60R 25/24* (2013.01)
*H04L 9/40* (2022.01)

(52) U.S. Cl.
CPC ............. *H04W 12/06* (2013.01); *B60R 25/24* (2013.01); *H04L 63/0492* (2013.01); *H04L 63/0853* (2013.01); *H04W 4/80* (2018.02)

(58) Field of Classification Search
CPC .... H04W 12/06; H04W 4/80; H04L 63/0492; H04L 63/0853; B60R 25/24
See application file for complete search history.

(56) References Cited

U.S. PATENT DOCUMENTS

| 9,639,825 B1* | 5/2017 | Roth ..................... H04L 9/3271 |
| 2014/0187189 A1 | 7/2014 | Reitsma et al. |
| 2018/0131408 A1 | 5/2018 | Austad |

FOREIGN PATENT DOCUMENTS

| EP | 2725834 A1 * | 4/2014 | ............ H04W 12/06 |
| JP | 2012098800 A | 5/2012 | |

(Continued)

OTHER PUBLICATIONS

Communication dated Jul. 6, 2021, from the Japanese Patent Office in application No. 2020127056.
European Search Report for EP 19 19 6180, dated Feb. 14, 2020.

*Primary Examiner* — Shawnchoy Rahman
(74) *Attorney, Agent, or Firm* — Sughrue Mion, PLLC

(57) ABSTRACT

A portable electronic authentication device (10) for providing access to a website or a computer resource or a secure place. The portable electronic device includes a first communication unit (11) and a second communication unit (12) different from the first communication unit. The first communication unit is intended to receive an interrogation signal ($S_P$) from a control device of a control system, which includes the portable electronic device. The second communication unit is intended to transmit a response signal ($S_L$) which includes identification data of the portable electronic device to authenticate the portable electronic device in the control system and allow access to a website or a computer resource or a secured place.

11 Claims, 1 Drawing Sheet

(56) References Cited

FOREIGN PATENT DOCUMENTS

| | | |
|---|---|---|
| JP | 2017045192 A | 3/2017 |
| JP | 2018523204 A | 8/2018 |
| WO | WO-2012095026 A1 * | 7/2012 ............ G06F 21/32 |
| WO | 2016193665 A1 | 12/2016 |
| WO | 2018/009692 A1 | 1/2018 |

* cited by examiner

PORTABLE ELECTRONIC AUTHENTICATION DEVICE

CROSS REFERENCE TO RELATED APPLICATIONS

This application claims priority to European Patent Application No. 19196180.4 filed Sep. 9, 2019, the entire contents of which are incorporated herein by reference.

TECHNICAL FIELD OF THE INVENTION

The invention relates to a portable electronic authentication device for accessing to a defined computer site or a specific apparatus or place.

The invention also relates to a control system comprising a portable electronic authentication device.

STATE OF THE ART

As identity and personal data theft is currently taking place, it is necessary to have authentication means, which are reliable and robust to various attacks, and easy to use. Several devices are known in particular for improving the security of computer accounts, such as USB keys, authentication badges, smart cards, biometric sensors, and even applications for mobile phones. However, all these technologies include many problems, such as the risk of loss or theft, copying and forgery, and a tedious use, which are disadvantages.

Patent EP 1 420 524 B1 describes a wireless information communication device, such as a watch, and a short distance wireless information communication system between the device and an electronic apparatus. The device can receive radio frequency signals and transmit information by other signals, which are mainly parasitic signals from the oscillator. Other signal communication means are also provided such as acoustic signals or light signals. On the other hand, nothing is described concerning a portable electronic authentication device giving access to a defined website or to a determined place.

Patent application WO 2012/166115 A1 describes a mobile telecommunication network so as to exchange authentication data with a mobile communication device. A first propagation means can be used such as a source of infrared, ultraviolet or visible light radiation, and a second propagation means can be used such as radiofrequency signals. The first propagation means cannot be received outside the location of the mobile communication device. The mobile communication device authenticates itself with the device, that has transmitted a query signal thereto, but not with third-party devices, which is a disadvantage.

Patent application EP 3 419 241 A1 describes a method and a system for preventing attacks by intermediate relays to gain access to a vehicle. A combination of two different propagation means is used for communication between a portable device (car key) and the vehicle to authenticate the device in order to gain access to the vehicle. An authentication of the portable device is carried out by measuring the distance between the portable device and the vehicle by an acoustic emitter. The vehicle refuses commands transmitted by radiofrequency signals if the device is too far away. This complicates the authentication of such a device, which is a disadvantage.

SUMMARY OF THE INVENTION

The invention therefore aims at overcoming the disadvantages mentioned above with a portable electronic authentication device to gain access to a defined computer site or to a determined apparatus or place without complication, in a semi-automatic and localised manner.

To this end, the invention relates to a portable electronic authentication device, which comprises the features of independent claim 1.

Particular embodiments of the portable electronic device are defined in dependent claims 2 to 6.

An advantage of the portable electronic authentication device lies in the fact that two different communication means are used for an authentication communication of a portable device in communication with a dongle or control device linked to a computer connection assembly. On the one hand, the first communication means is used for proximity or short distance communication if the portable device is close to the dongle or control device. On the other hand, the second communication means is orthogonal to the first communication means and can be a long distance communication means.

Advantageously, the first communication means transmits or receives an infrared, optical, sound, ultrasonic or near field (NFC) signal. The second communication means transmits or receives an RF, HF, UHF or Bluetooth signal. Thus it allows adding an additional security layer to the authentication mechanism because the data exchange allowing authentication takes place on two orthogonal means, one of which is very localised around the resource requiring user authentication. The authentication mechanism itself is based on technologies known to the person skilled in the art.

The present invention relates only to the authentication of the portable device and not to the securing of communications. In addition, the location of the resource to be accessed do not need to be opaque to communication media.

Advantageously, with the authentication of the portable device, there may be automatic access to computer stations and resources, a digital signature of documents or e-mails, encryption or decryption of various documents or e-mails, a secure storage of passwords, and automatic door opening with user access management.

Advantageously, the portable device is difficult to steal or lose, always with oneself, clearly visible for connection to a computer, practical and aesthetic, possible deactivation if the device is stolen, password or identification sequence or the like to reactivate the function once the device is put back on the wrist if it is a wristwatch or bracelet.

To this end, the invention also relates to a control system comprising a portable electronic authentication device, which includes the features of independent claim 7.

Particular embodiments of the control system are defined in dependent claims 8 to 10.

BRIEF DESCRIPTION OF THE FIGURES

The purposes, advantages and features of the portable electronic authentication device and of the system comprising it will appear better in the following description on the basis of at least one non-limiting embodiment illustrated by the drawings wherein.

DETAILED DESCRIPTION OF THE INVENTION

In the following description, all the electronic components of a control system having a portable electronic authentication device, which are well known to a person skilled in the art in this technical field, are described only in a simplified manner.

Figure 1:
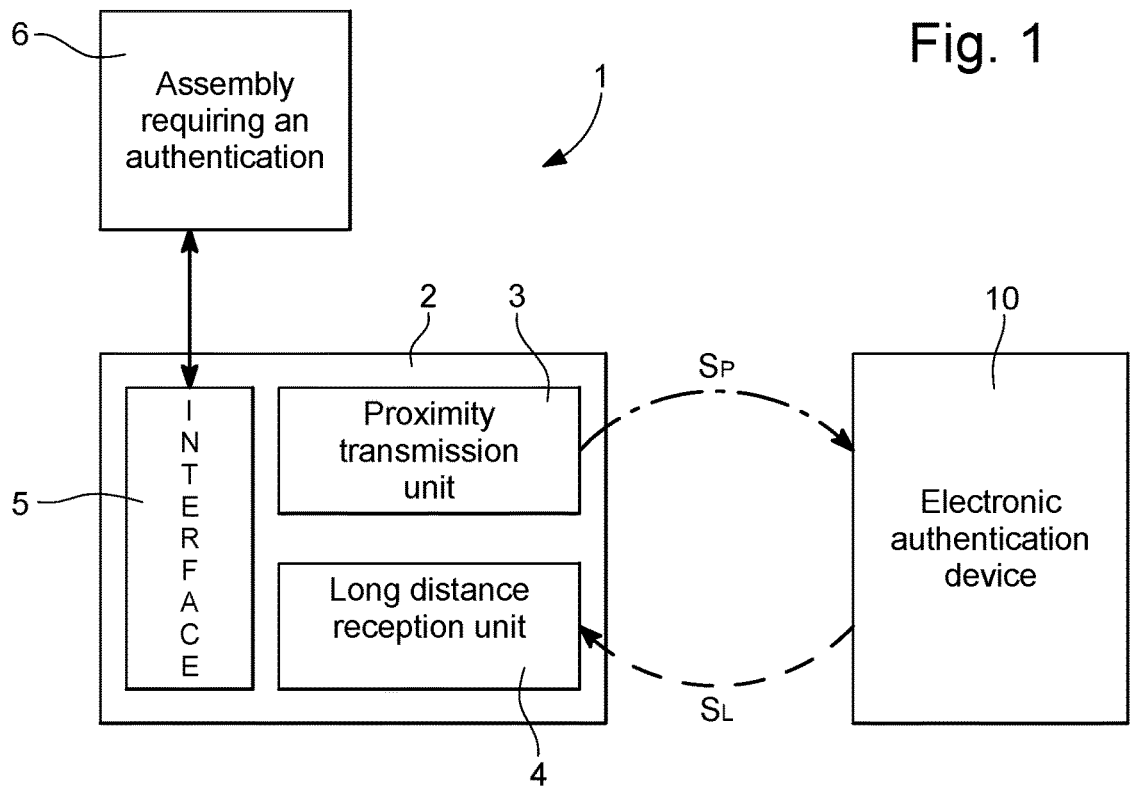
FIG. 1 shows a simplified block diagram of the electronic components of a control system having a portable electronic authentication device according to the invention.

FIG. 1 schematically shows a control system 1, which mainly comprises a portable electronic authentication device 10 personalised to the person wearing it. This portable electronic authentication device 10 can be a wristwatch, a bracelet, a badge, a piece of jewelry or another device capable of being worn by a person.

The control system 1 also comprises a dongle or control device 2, which can be plugged in or connected via a connection interface 5 to a connection assembly 6 requiring authentication of the portable device 10. The dongle 2 can be in the form of a USB key plugged into the connection assembly 6, such as a computer, or be integrated into the connection assembly 6 such as computer hardware, for example. The connection assembly 6 can therefore be a portable or desktop computer, a computer server, an access gate or other apparatus requiring authentication of the portable device 10 for access to a website or a computer resource or a secure place.

The dongle or control device 2, which is electrically powered by the connection assembly 6, further comprises a first communication means 3 for transmitting an interrogation signal $S_P$ (challenge) and a second communication means 4, different from the first communication means 3, for receiving a response signal $S_L$. The first communication means 3 can be a proximity transmission unit 3 of an interrogation signal $S_P$, while the second communication means 4 can be a long distance reception unit 4 of a reception signal $S_L$. Even if not shown in FIG. 1, the dongle or control device 2 may comprise a controller, such as a microcontroller or a network of programmable gates (FPGA) or other processing circuit, which is disposed between the interface 5 and the transmission and reception units 3, 4.

The interrogation signal $S_P$, which is preferably encrypted in particular managed by the connection assembly 6 linked to the dongle or control device 2, is transmitted to the portable device 10 if it is in the proximity of the dongle or control device 2. The portable device 10 receives and decrypts the interrogation signal $S_P$ so as to calculate an authentication response, which it transmits by the response signal $S_L$ to the dongle or control device 2.

The first communication means 3, such as the proximity transmission unit, is a proximity communication means for transmitting an interrogation signal $S_P$, which can be an infrared, optical, ultrasonic, sound or near field (NFC) signal. The second communication means 4, such as the long distance reception unit, is a long distance communication means for receiving a response signal $S_L$, which can be an RF, HF, UHF or even a Bluetooth signal. The transmission 3 and reception 4 means can be separated or combined into a single component.

Figure 2:
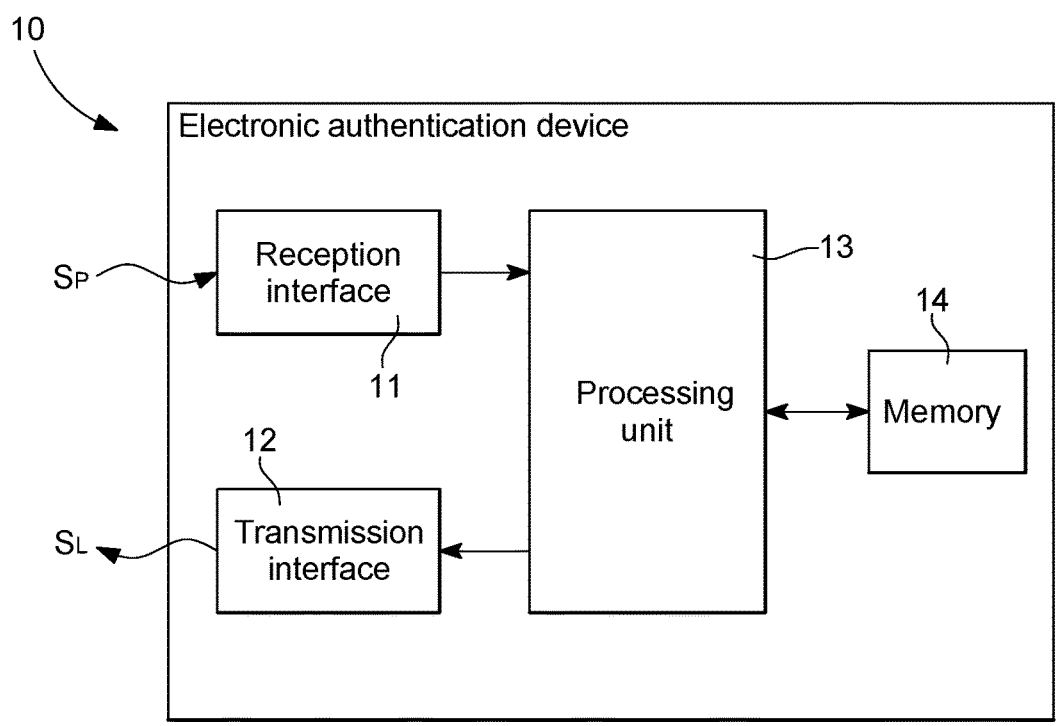
FIG. 2 shows in more detail the electronic components of the portable electronic authentication device according to the invention.

FIG. 2 shows the portable electronic authentication device 10. This portable device 10 comprises a first communication means 11, such as a reception interface or reception unit 11 for receiving an interrogation signal $S_P$ originating from the dongle or control device. Preferably, the first communication means is a proximity communication means to receive the interrogation signal $S_P$ when the portable device 10 is in the proximity of the dongle or control device. The proximity distance can be less than 1 m. The portable device 10 also comprises a second communication means 12, such as a transmission interface or transmission unit 12 for transmitting a response signal $S_L$ towards the dongle or control device following the calculation of an authentication response. The second communication means 12 can be used for long distance communication. The portable device 10 also comprises a processing unit 13 linked to the two reception and transmission interfaces 11, 12 for processing the encrypted received and transmitted signals. A memory 14 can also be provided for storing in particular identification data for authenticating the person wearing the portable device 10. The memory can be a non-volatile memory. The portable device 10 can be powered with electricity by a battery or cell or a solar cell or a thermoelectric generator, if the portable device is in the form of a wristwatch or a bracelet.

The processing unit 13 can for example be a microcontroller, which comprises a time base for timing all the operations of reception or transmission of a signal by the interfaces, and an encryption module (hardware or software) for calculating a response signal $S_L$.

It should be noted that the reception interface 11 and the transmission interface 12 can be separated or combined into a single component or integrated into the same integrated circuit with the other electronic components of the portable device 10.

After receiving the response signal $S_L$, the dongle or control device of the system transmits this received response signal $S_L$ to the connection assembly to authenticate the portable device 10 after a comparison with a prototype response pre-calculated in the connection assembly, such as a computer linked to an internet network for example. If the portable device is authenticated, an authorisation is provided by the connection assembly to gain access to a website or a computer resource or a secure place.

From the description which has just been made, several variant embodiments of a portable electronic authentication device and of the control system comprising it are possible without departing from the scope of the invention defined by the following claims.

What is claimed is:

1. A control system to provide access to a website, a computer resource, or a secure place, the control system comprising:
   a computer connection assembly comprising a processor;
   a control device connected to the computer connection assembly; and
   a portable electronic authentication device comprising:
      a receiver configured to receive an interrogation signal from the computer connection assembly via the control device; and
      a transmitter, different from the receiver, configured to transmit a response signal, which comprises identification data of the portable electronic authentication device, to the computer connection assembly via the control device to authenticate the portable electronic authentication device and allow access to the website, the computer resource, or the secure place,
   wherein the receiver is configured for proximity or short distance communication with the control device of the control system,
   wherein the transmitter is orthogonal to the receiver and is a long distance communication transmitter, and
   wherein the computer connection assembly is configured to authenticate the response signal that is received by the control device from the portable electronic authentication device.

2. The control system according to claim 1, wherein the interrogation signal is an infrared, optical, sound, ultrasonic, or near field (NFC) signal.

3. The control system according to claim 1, wherein the transmitter is configured to transmit a radio-frequency signal as the response signal.

4. The control system according to claim 1, wherein the portable electronic authentication device further comprises a processor connected to the receiver and the transmitter, the processor of the portable electronic authentication device configured to process the interrogation signal that is received and calculate the response signal with identification data from the portable electronic authentication device to authenticate the portable electronic authentication device.

5. The control system according to claim 4, wherein the processor of the portable electronic authentication device is a microcontroller with an encryption module.

6. The control system according to claim 1, wherein the portable electronic authentication device is powered by a battery, a cell, or a thermoelectric generator.

7. The control system according to claim 1,
wherein the control device comprises a short distance or proximity transmitter configured to transmit the interrogation signal to the portable electronic authentication device and a long distance receiver, different from the short distance or proximity transmitter, configured to receive the response signal from the portable electronic authentication device.

8. The control system according to claim 7, wherein the short distance or proximity transmitter is configured to send an infrared, optical, sound, ultrasonic, or near field (NFC) interrogation signal as the interrogation signal.

9. The control system according to claim 7, wherein the long distance receiver is configured to receive the response signal from the portable electronic authentication device, the response signal being a radio-frequency response signal.

10. The control system according to claim 7, wherein the computer connection assembly is configured to encrypt the interrogation signal that is transmitted to the portable electronic authentication device via the control device, and the response signal is encrypted.

11. The control system according to claim 1, wherein the interrogation signal is an infrared, optical, sound, or ultrasonic signal.

* * * * *